United States Patent
Hugot et al.

(10) Patent No.: US 10,851,667 B2
(45) Date of Patent: Dec. 1, 2020

(54) PROCESS FOR PRODUCING A THERMAL BARRIER IN A MULTILAYER SYSTEM FOR PROTECTING A METAL PART AND PART EQUIPPED WITH SUCH A PROTECTIVE SYSTEM

(71) Applicants: SAFRAN AIRCRAFT ENGINES, Paris (FR); CENTRE NATIONAL DE LA RECHERCHE SCIENTIFIQUE, Paris (FR); INSTITUT NATIONAL POLYTECHNIQUE DE TOULOUSE, Toulouse (FR); UNIVERSITE PAUL SABATIER DE TOULOUSE, Toulouse (FR)

(72) Inventors: Juliette Hugot, Jaunay-Clan (FR); Mathieu Boidot, Toulouse (FR); Daniel Monceau, Nailloux (FR); Djar Oquab, Mons (FR); Claude Estournes, Rieumes (FR)

(73) Assignees: SAFRAN AIRCRAFT ENGINES, Paris (FR); CENTRE NATIONAL DE LA RECHERCHE SCIENTIFIQUE, Paris (FR); INSTITUT NATIONAL POLYTECHNIQUE DE TOULOUSE, Toulouse (FR); UNIVERSITE PAUL SABATIER DE TOULOUSE, Toulouse (FR)

(*) Notice: Subject to any disclaimer, the term of this patent is extended or adjusted under 35 U.S.C. 154(b) by 240 days.

(21) Appl. No.: 16/189,712

(22) Filed: Nov. 13, 2018

(65) Prior Publication Data
US 2019/0101020 A1   Apr. 4, 2019

Related U.S. Application Data

(62) Division of application No. 14/003,339, filed as application No. PCT/FR2012/050470 on Mar. 7, 2012, now Pat. No. 10,161,262.

(30) Foreign Application Priority Data

Mar. 7, 2011  (FR) ..................... 11 51836

(51) Int. Cl.
*F01D 25/08*  (2006.01)
*C23C 24/08*  (2006.01)
(Continued)

(52) U.S. Cl.
CPC ............. *F01D 25/08* (2013.01); *B05D 3/068* (2013.01); *C23C 24/082* (2013.01);
(Continued)

(58) Field of Classification Search
CPC ..... B05D 3/068; C23C 24/082; C23C 28/321; C23C 28/3455; C23C 28/36; F01D 25/08;
(Continued)

(56) References Cited

U.S. PATENT DOCUMENTS

| 5,384,200 A | 1/1995 | Giles et al. |
| 8,956,478 B2 | 2/2015 | Allemand et al. |

(Continued)

FOREIGN PATENT DOCUMENTS

| CN | 101004142 A | 7/2007 |
| FR | 2932496 A1 | 12/2009 |

(Continued)

OTHER PUBLICATIONS

Office Action dated Mar. 9, 2017, in European Patent Application No. 12 712 339.6.
(Continued)

*Primary Examiner* — Jenny R Wu
(74) *Attorney, Agent, or Firm* — Oblon, McClelland, Maier & Neustadt, L.L.P.

(57) ABSTRACT

The object of the present invention is to produce a metal part equipped with a protection system, particularly for turbine blades for aircraft engines, having a thermal barrier that is improved in terms of thermal properties, adhesion to the part and resistance to oxidation/corrosion. In order to achieve this, the method according to the invention produces in a single step, from specific ceramics, coating layers using SPS technology.

According to one embodiment, a metal part is produced according to an SPS flash sintering method and comprises a superalloy substrate (22), a metal sub-layer (21), a TGO oxide layer (25) and the thermal barrier (23) formed by said method from at least two chemically and thermally compatible ceramic layers (2a, 2b).

A first ceramic (2a), referred to as the inner ceramic, is designed to have a substantially higher expansion coefficient. The outer ceramic (2b) is designed to have at least lower thermal conductivity, and a sintering temperature and/or maximum operating temperature that is substantially higher. The thermal barrier (23) has a composition and porosity gradient (3) from the metal sub-layer (21) to the outer ceramic (2b).

19 Claims, 2 Drawing Sheets

(51) Int. Cl.
*C23C 28/00* (2006.01)
*B05D 3/06* (2006.01)
*F01D 5/28* (2006.01)

(52) U.S. Cl.
CPC ........ *C23C 28/321* (2013.01); *C23C 28/3455* (2013.01); *C23C 28/36* (2013.01); *F01D 5/288* (2013.01); *Y02T 50/60* (2013.01); *Y10T 428/12458* (2015.01); *Y10T 428/12549* (2015.01)

(58) Field of Classification Search
CPC .......... F01D 5/288; Y02T 50/60; Y02T 50/67; Y02T 50/6765; Y10T 428/12458; Y10T 428/12549

See application file for complete search history.

(56) References Cited

U.S. PATENT DOCUMENTS

| | | |
|---|---|---|
| 2003/0059633 A1 | 3/2003 | Ackerman et al. |
| 2003/0148148 A1 | 8/2003 | Dietrich et al. |
| 2004/0012307 A1 | 1/2004 | Fukuda et al. |
| 2004/0058200 A1 | 3/2004 | Chaput et al. |
| 2005/0034669 A1 | 2/2005 | Movchan et al. |
| 2005/0282032 A1 | 12/2005 | Gupta et al. |
| 2007/0140840 A1 | 6/2007 | Schmitz et al. |
| 2007/0160859 A1 | 7/2007 | Darolia et al. |
| 2007/0172703 A1 | 7/2007 | Freling et al. |
| 2008/0145643 A1 | 6/2008 | Reynolds et al. |
| 2012/0087457 A1 | 4/2012 | Garnier et al. |

FOREIGN PATENT DOCUMENTS

| | | |
|---|---|---|
| FR | 2 941 965 | 8/2010 |
| JP | 2007-182631 A | 7/2007 |
| WO | WO 01/63008 A1 | 8/2001 |
| WO | WO 2007/112786 | 10/2007 |

OTHER PUBLICATIONS

Boidot, M., et al. "Proto-TGO formation in TBC systems fabricated by spark plasma sintering," Surface & Coatings Technology, vol. 205, No. 5, pp. 1245-1249, (Sep. 25, 2010) XP 27507472.

Song, J., et al., "Simultaneous synthesis by spark plasma sintering of a thermal barrier coating system with a NiCrAlY bond coat", Surface & Coatings Technology, vol. 205, No. 5, pp. 1241-1244 (Aug. 25, 2010) XP 27507471.

International Search Report dated May 23, 2012 in PCT/FR12/050470 Filed Mar. 7, 2012.

Machine Translation of FR 2932496 obtained from the EPO website, internet retrieval date of Jun. 10, 2015.

US 10,851,667 B2

PROCESS FOR PRODUCING A THERMAL BARRIER IN A MULTILAYER SYSTEM FOR PROTECTING A METAL PART AND PART EQUIPPED WITH SUCH A PROTECTIVE SYSTEM

TECHNICAL FIELD

The invention relates to a method for producing a thermal barrier in a multilayered system for protecting a metal part made of superalloy. The invention further relates to a metal part made of superalloy equipped with such a protection system.

The field of the invention is the development of refractory materials capable of constituting thermo-mechanical parts, particularly HP (High Pressure) turbine parts, such as rotor blades or distributors.

The ongoing improvement to the performance of modern gas turbines requires the use of increasingly higher turbine input temperatures and thus the use of materials with even greater refractory properties.

PRIOR ART

For this reason, nickel (Ni) and aluminium (Al) based superalloys have been developed, such as equiaxed superalloys, then directionally solidified superalloys and, finally, single-crystal superalloys. However, the development of these superalloys is currently inadequate to respond to the ever increasing demands of high-temperature parts in terms of lifetime. Typically, the maximum operating temperature for superalloys is approximately 1,100° C., whereas the temperature of the combustion intake gases or turbine exhaust gases can significantly exceed 1,600° C.

In this context, thermal insulating coatings for these superalloys have emerged, allowing the temperature of the metal in parts cooled by internal convection to be reduced. These thermal insulating coatings, referred to as thermal barriers, or even TBs, are generally constituted by an outer zirconium oxide (or zirconia) based ceramic layer stabilised by yttrium oxide (or yttria), also referred to as yttriated zirconia, deposited on a metal bonding sub-layer. The sub-layer is designed to provide adhesion to the ceramic layer whilst protecting the metal of the part against oxidation and corrosion.

The metal sub-layer can be formed by a galvanic deposit of platinum, followed by vapour-phase aluminising. The insulating ceramic layer of yttriated zirconia is then deposited onto this sub-layer either by thermal spraying (in which case the microstructure of the resulting deposit is of the lamellar type) or by electron-beam vaporisation of the material (in which case the microstructure of the resulting deposit is of the columnar type).

In order to improve the performance of TB coatings in terms of resistance to oxidation/corrosion at high temperature, metal sub-layer compositions have been developed, such as sub-layers of compositions of the $Ni_{(1-x)}Pt_xAl$ (nickel-platinum-aluminium) type. Platinum is deposited onto the part by electrolysis, aluminium is deposited by chemical vapour deposition (CVD) or by physical vapour deposition (PVD).

Other developments have focused on improving the ceramic layer, particularly on the formation of the yttriated zirconia layer using the sol-gel method or cold plasma treatment.

DESCRIPTION OF THE INVENTION

The TB coatings provided by these developments remain limited in terms of performance and lifetime, particularly with regard to oxidation/corrosion resistance. Furthermore, the reproducibility of the methods used is not guaranteed, particularly for producing the coating with an $Ni_{(1-x)}Pt_xAl$ sub-layer. In addition, the methods that are implemented require a significant number of delicate and long operations.

The specific object of the invention is to overcome these disadvantages by proposing a method for producing improved TB compositions with even greater refractory properties and substantially better resistance to oxidation and corrosion.

In order to achieve this, the method according to the invention produces, from a stack of specific ceramic layers, each layer having specific properties and functions, which differ and are even the opposite from one layer to the next, layers of coating in a single step by applying Field Assisted Sintering Technology (FAST), in this case Spark Plasma Sintering (SPS) technology.

SPS technology simultaneously combines the application of a uniaxial pressure and DC pulses in a controlled environment (vacuum or specific gases). This technology is known in the powder metallurgy field as it allows, by compaction and sintering, metal parts or oxides to be produced from powders. In particular, the use of SPS technology allows parts of microstructures to be manufactured that are controlled in terms of grain size and porosity.

More specifically, the object of the present invention is a method for producing a thermal barrier in a multilayered system for protecting a metal part made of superalloy. The method consists in producing a thermal treatment by flash sintering protection materials in superposed layers in an SPS machine enclosure. These layers comprise, on a superalloy substrate, at least two layers of zirconium-based refractory ceramics, a first ceramic layer, referred to as the inner layer, that is chemically and thermally compatible with the substrate, and a final ceramic layer, referred to as the outer layer, that is disposed over the other layers. This outer layer has higher physicochemical resistance properties, in relation to external pollutants of the CMAS type, and/or thermal resistance properties than the inner layer.

The effect of the physicochemical resistance is, in particular, a wetting coefficient between the pollutants and the outer layer that is sufficient to prevent the spreading and the penetration of pollutants melted on the outer layer. Advantageously, the outer layer can contain an element, particularly cerium or another element from the group of rare-earths which, in the event of chemical interaction with pollutants, increases the melting temperature thereof.

Preferably, the materials are selected so that the expansion coefficients are high enough to follow the expansion of the superalloy that remains the coldest.

Advantageously, an assembly of metal sheets forming a metal sub-layer can be disposed between the superalloy substrate and the ceramic layers.

Preferably, the inner layer can have a thermal expansion coefficient that is substantially higher than that of the final ceramic layer, in particular a thermal expansion coefficient that is between that of the substrate and that of the final ceramic layer, and the outer layer of the thermal barrier can have a natural sintering temperature, as well as a maximum operating temperature, that is substantially higher than that of the inner layer.

More specifically, the physicochemical resistance properties of the outer layer relate to sintering, corrosion, erosion and/or aerodynamics, these properties being implemented by a selection of ceramics that respectively relate to a thermal conductivity, a porosity, a hardness and/or a roughness that is suitable and is reinforced by the thermal treatment of the SPS machine. The outer layer thus has, relative to the inner layer, at least one of the properties selected from among the following: lower thermal expansion, greater hardness, lower thermal conductivity, substantially higher sintering temperature, lower open porosity and/or less roughness.

In particular, thermal barrier porosities of between 15% and 25%, with porosity of less than 15% for the outer layer, are preferred. The roughness of the outer layer is preferably less than 10 micrometers.

In fact, the thermal barrier has, due to the formation of composition and porosity gradients, a gradient of passage between the function exerted by each of the ceramic layers taken individually in relation to their relative characteristics: the inner layer favours anchoring on the metal sub-layer, particularly on an alumina layer that forms on the surface of the metal sub-layer, by virtue of its expansion coefficient that is consistent with the thermal properties of this sub-layer and those of the alumina layer. The result is that the constraints between the sub-layer, the alumina layer and the inner ceramic layer are accommodated. The outer layer provides greater thermal protection in operating conditions, particularly in turbines, by virtue of being more refractory than the inner layer, as well as having a higher sintering resistance and maximum operating temperature.

Other resistance properties (erosion, corrosion) and aerodynamic improvement by smoothing the outer layer can also be implemented by the selection of the material for the outer layer or of additional suitable layers. In particular, a harder material provides better resistance to erosion. A material with low open porosity provides better resistance to high-temperature corrosion (for example, to pollution of the CMAS (calcium-magnesium-aluminium-silicate oxides) type. A small-grain material provides less roughness and thus improves the aerodynamic properties.

According to specific embodiments, with the enclosure being equipped with pressurisation means and electric means for passing pulsed current, the pressurisation and the passing of the pulsed current are carried out, in a production step, according to a flash sintering cycle that is temperature-, pressure- and time-controlled, with a temperature threshold of between 1,000° C. and 1,600° C., preferably between 1,100° C. and 1,400° C., and a pressure threshold of between 15 Mpa and 150 Mpa, preferably between 10 Mpa and 100 MPa, so that the thermal barrier has a composition, porosity and function gradient for anchoring to the metal sub-layer, on the one hand, and for external protection and/or smoothing (in other words: roughness), on the other hand.

The invention further relates to a metal part made of superalloy, which is equipped with a protection system comprising a thermal barrier and is produced according to the aforementioned sintering method. The metal part thus comprises a substrate, constituted by a nickel-based superalloy, a metal sub-layer having platinum-enriched beta-(Ni, Pt)Al and/or alpha-NiPtAl phases, an aluminium oxide layer formed by thermal growth or TGO ("Thermally Grown Oxide") when the part is produced by flash sintering, and a thermal barrier formed by said method from at least two chemically and thermo-mechanically compatible zirconium-based ceramic layers and having an outer face. A first ceramic layer, referred to as the inner layer, disposed as close as possible to the metal sub-layer, is chemically and thermally compatible with this sub-layer, and a final outer ceramic layer, disposed as close as possible to the outer face of the barrier, is designed to have higher physicochemical and/or thermal resistance properties than the inner layer.

Preferably, the inner ceramic is designed to have an expansion coefficient that is substantially higher than that of the outer ceramic disposed as close as possible to the outer face of the barrier. This outer ceramic advantageously has thermal conductivity that is substantially lower than that of the inner ceramic, and a natural sintering temperature and/or a maximum operating temperature that is substantially higher than that of the inner ceramic. The thermal barrier has a composition and porosity gradient from the metal sub-layer to the outer face, and a functions gradient for anchoring to the metal sub-layer, on the one hand, and for protecting and/or smoothing the outer face, on the other hand.

In these conditions, the thermal barrier has, in addition to the thermal stability properties, low thermal conductivity, a thermal expansion coefficient close to that of the substrate and good resistance to sintering, as well as resistance to corrosion by chemical inertia in relation to calcium-, magnesium- and aluminium-silicate-oxides by virtue of its granular microstructure with isotropic porosity, resistance to erosion and good aerodynamic properties, as well as excellent adhesion on the TGO layer.

The metal parts that are more particularly, but not exclusively, targeted are turbine parts or gas turbine compressor parts, in particularly dresser, distributor or combustion chamber blades.

According to specific modes:
the ceramics are selected from "YSZ" compounds of zirconium ($ZrO_2$) partially stabilised by yttria ($Y_2O_3$), "GYSZ" compounds of YSZ doped with gadolinium oxide ($Gd_2O_3$), "LZ" compounds of lanthanum zirconate ($La_2Zr_2O_7$), and "LZC" compounds of partially ceriated lanthanum zirconates;
the inner/outer ceramics are advantageously selected from the following pairs: xYSZ/LZ with a percentage x by mass of yttria greater than or equal to 7%, xYSZ/LZC and xYSZ/GYSZ, in particular x=7 and x=8;
the LZC compounds are LZyC(1−y), with y=70%, y and 1−y representing the additional percentages of zirconium and partially ceriated zirconate cerium, and the compounds of doped YSZ are tGvYSZ, with a percentage by mass of gadolinium oxide equal to 2% and a percentage v by mass of YYSZ equal to 8%.

BRIEF DESCRIPTION OF THE DRAWINGS

Further features and advantages of the invention will become apparent upon reading the following description, which relates to one embodiment, and with reference to the appended drawings, in which.

DETAILED DESCRIPTION

The terms "vertical" and "horizontal", "upper" or "lower", and their derivatives, relate to the elements as shown in the figures, i.e. during operating mode.

Figure 1:
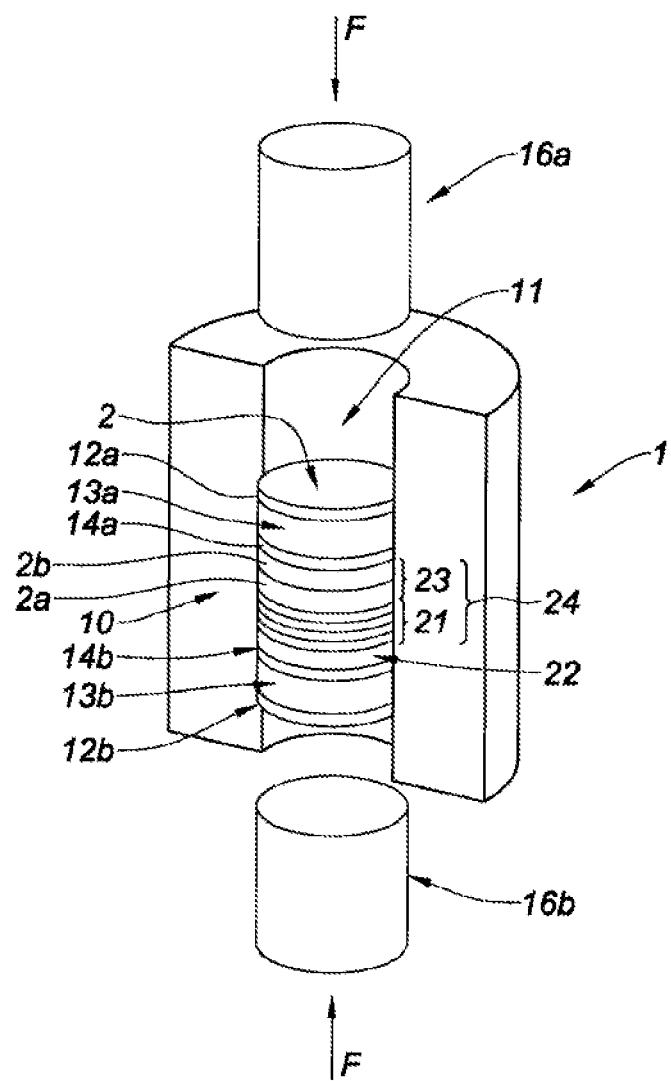
FIG. 1 is a partial schematic cross-section of an SPS tooling comprising a matrix and pistons, in which an example of the assembly of layers of a sample of a metal part according to the invention has been introduced in order to complete flash sintering.

FIG. 1 shows a partial vertical cross-section of an SPS tooling 1 placed in a vacuum during use. The tooling 1 comprises a hollow graphite matrix 10 surrounding a cylindrical chamber 11. An assembly of layers 2 of a sample of a metal part according to the invention has been introduced into this chamber for flash sintering to be carried out. The layers shown here are circular for forming a pin, in order to highlight the structures obtained after sintering. The invention extends to the production of any type of part having a geometric shape adapted to their use by using a chamber or mould with suitable geometry.

Electric contacts 12a. 12b and 14a, 14b are arranged in the chamber 11, either side of the assembly 2. The contacts 12a and 14a and 12b and 14b, respectively, are disposed either side of an electrical barrier 13a or 13b, respectively, in this case constituted by an alumina powder. These contacts are made of flexible graphite, for example. Papyex®. This material prevents the pollution of the mould and facilitates removal from the mould. The electrical barriers limit the passage of the current through the assembly 2, which current mainly passes through the mould 10.

The tooling further comprises graphite terminals, 16a and 16b, for electric power-up, with vertical longitudinal axes. These terminals also act as pistons that compress the contacts 14a and 14b either side of the assembly 2 by exerting an external load (F arrows).

The assembly 2 is more specifically constituted by a stack of metal sheets, constituting a metal sub-layer 21 between a superalloy substrate 22 and ceramic layers 2a, 2b, and a thermal barrier 23 deposited as a ceramic powder onto the sheets constituting the sub-layer 21 so as to form a system 24 for protecting the substrate 22.

In the example, the substrate 22 is an "AM1" Ni-based superalloy and comprises tantalum (Ta), chromium (Cr), cobalt (Co), tungsten (W), aluminium (Al), molybdenum (Mo) and titanium (Ti). On this substrate the metal sub-layer 21 is constituted by a succession of 5 µm thick platinum sheets and of 2 µm thick aluminium sheets. The thermal barrier 23 is constituted by two ceramic layers 2a and 2b successively added to the sub-layer 21 in the form of powders.

In the example, the layer 2a, referred to as the inner layer, is constituted by an 8YSZ ceramic powder, i.e. zirconia stabilised at 8% by mass of yttria. The layer 2b, referred to as the outer layer, is constituted by a 2G8YSZ ceramic powder, i.e. zirconia (ZrO2) partially stabilised with yttria (8% by mass) and doped with gadolinium oxide (GdO2) or Gd at 2% by mass.

In other examples, the layers 2a and 2b are constituted by ceramic powders, respectively 7YSZ/LZ and 7YSZ/LZ7C3 (i.e. with 70% of zirconia and, in a complementary manner, with 30% cerium).

Figure 2:
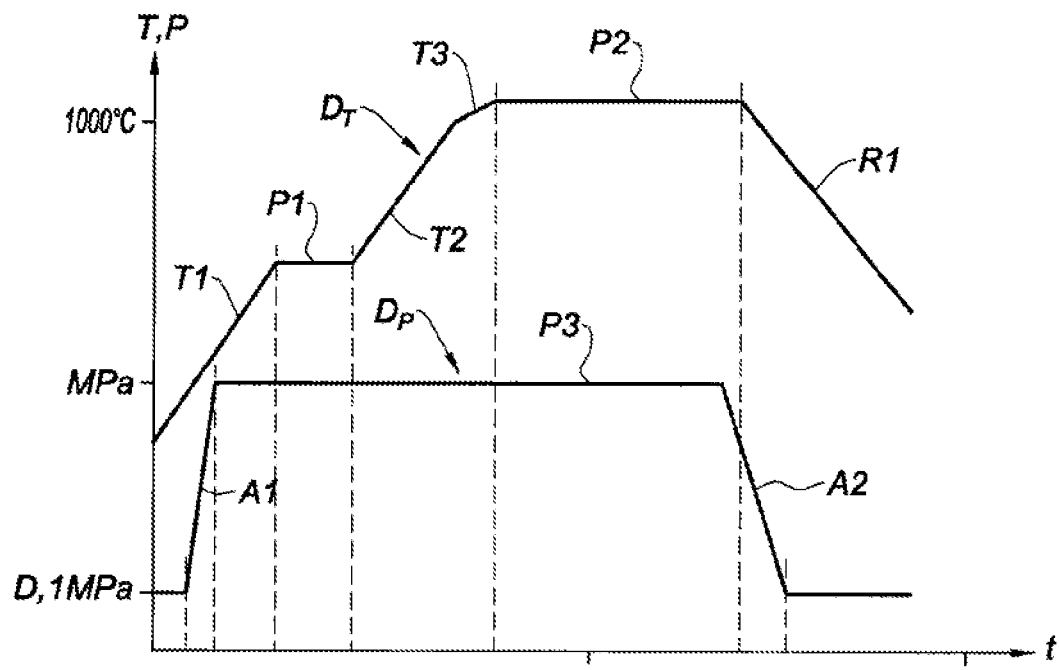
FIG. 2 shows an example of diagrams of temperature and pressure adjustment cycles as a function of time for the flash sintering of the aforementioned assembly.

During the flash sintering operation, the temperature "T" and pressure "P" adjustment cycles as a function of time "t" follow the diagrams of FIG. 2. The temperature diagram $D_T$ reaches a first threshold P1 of 700° C. after a temperature increase T1, with a ramp of 100° C. per minute. The first threshold P1 lasts for approximately 10 minutes and is followed by a second temperature increase T2, with the same ramp, for approximately 10 minutes.

This second increase is followed by a third increase T3 with a lower pitch (50° C./min) and duration (approximately 5 minutes) so as to reach the second threshold, or the main threshold, P2. This second threshold P2 is located in the 1,100-1,200° C. interval and lasts for approximately 15 minutes. Temperature-controlled cooling R1 is carried out for approximately 30 minutes with a pitch of the order of 20° C. per minute in order to reach approximately 500° C. This cycle lasts for approximately one hour. This first temperature drop is followed by a second natural cooling stage in order to reach the ambient temperature.

The pressure diagram $D_P$ shows an extremely fast pressure increase A1 from the atmospheric pressure of 0.1 Mpa to reach 100 Mpa in the example. A pressure threshold P3 is maintained and lasts for a significant part of the operation, for example for 40 to 50 minutes. The pressure drop A2 is operated over a very short time in order to return to the atmospheric pressure.

Figure 3:
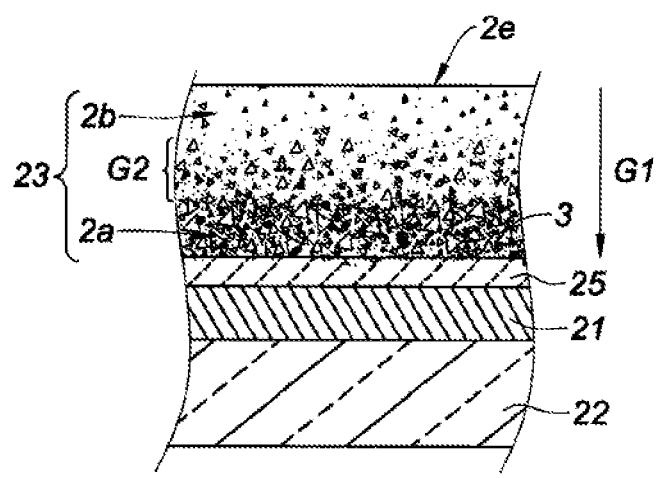
FIG. 3 is a cross-section of a sample according to FIG. 1 after the completion of the flash sintering.

A 3-dimensional sample of a metal part coated with a protection system, according to the invention, provided by flash sintering is shown in the cross-section of FIG. 3. It is composed of the superalloy substrate 22 covered with a protection system comprising, in successive layers, the metal sub-layer 21, an alumina layer 25, referred to as the "TGO" layer, and the thermal barrier 23 composed of inner 2a and outer 2b ceramics, initially made of layers separated before the flash sintering operation.

The outer ceramic 2b has relatively low thermal conductivity, between 0.8 and 1.7 $Wm^{-1}K^{-1}$ before consolidation and less than 0.8 after working.

In addition, the maximum operating temperatures of the ceramics 2b and 2a are equal to 1,200° C. and 1,600° C. and more, respectively. Furthermore, the outer ceramic 2b does not exhibit natural sintering up to temperatures of 1,600° C. or more.

Moreover, the outer ceramic 2b advantageously has an expansion coefficient that is substantially higher than that of the inner ceramic 2a, which is $10.4 \cdot 10^{-6} K^{-1}$. The difference between these expansion coefficients governs the lifetime of the assembly, particularly the adhesion of the ceramic to the TGO oxide that formed during SPS sintering.

Furthermore, the granulometries of the initial powders of the two ceramics have been selected so that the inner layer is ultimately less dense than the outer layer. The denser outer layer can then more easily stop the pollutants of the CMAS (calcium-magnesium-aluminium-silicate oxides) type that cannot penetrate said outer layer. The less dense inner layer thus more easily accommodates the deformations of the substrate and the sub-layers.

In addition, the thermal properties of the outer ceramic 2b provide good resistance in operating conditions, particularly in turbines in which the gas temperatures can reach 1,600° C. or more.

FIG. 3 also shows the porosity gradient G1 of the thermal barrier 23, with an increase in the size of the pores 3 of the layers of the thermal barrier 23 from the outer face 2a to the TGO layer. A ceramic composition gradient G2 of the barrier 23 is also shown, with the interpenetration of the initial layers of ceramics 2a and 2b in an intermediate zone of the barrier 23. These gradients result in a progressive gradient of variation of the initial properties of the two ceramics between the TGO layer, where the properties are those of the initial inner layer 2a, and the outer face 2e, where the properties are those of the initial layer 2b. There follows a progressive gradient of the properties and thus of the functions of the thermal barrier 23, ranging from compatibility with the metal sub-layer to a thermal protection function on the outer face 2e.

The invention is not limited to the examples that have been described and shown herein. It is, for example, possible to combine more than two initial layers of ceramics, for example, three or four layers of chemically and thermo-mechanically compatible ceramics. Advantageously, these layers have properties and thermal functions that vary in the same direction between the first inner layer closest to the metal sub-layer and the outer layer deposited over the other layers. The first inner layer has thermo-mechanical properties compatible with those of the metal sub-layer, and the final outer layer has the most resistant thermal properties in terms of use in temperature conditions that are equal to or greater than approximately 1,600° C. It is also possible to add a layer that is only designed to protect the assembly against corrosion from CMAS and/or to improve the aerodynamics by smoothing the thermal barrier.

The invention claimed is:

1. A metal part made of superalloy, equipped with a thermal barrier being formed by a flash sintering operation in an SPS machine enclosure,
   wherein the metal part comprises
      a substrate, and
      a thermal barrier comprising at least two ceramic layers consisting of zirconium-based refractory ceramic, at least one layer is an inner ceramic layer of zirconium-based refractory ceramic, and at least one layer is an outer ceramic layer of zirconium-based refractory ceramic having an outer face and being disposed over the inner ceramic layer,
   wherein the thermal barrier has a porosity gradient, with porosity increasing from the outer ceramic layer to the inner ceramic layer with regard to the metal part,
   wherein
      (i) the outer ceramic layer has at least one physico-chemical resistance property to calcium-magnesium-aluminum-silicate oxide pollutants which is higher than that of the inner ceramic layer, or
      (ii) the outer ceramic layer has a higher thermal resistance property than that of the inner ceramic layer
   wherein the thermal barrier formed by the flash sintering operation is a monolayer having a gradient of properties from the metal part to the outer face of the outer ceramic layer corresponding to the gradient of initial properties of the inner ceramic layer and the outer ceramic layer, and
   wherein the inner ceramic layer has a higher thermal expansion coefficient than the outer ceramic layer.

2. The metal part according to claim 1, wherein the substrate comprises a nickel-based superalloy.

3. The metal part according to claim 1, wherein the metal part comprises a metal sub-layer.

4. The metal part according to claim 3, wherein the metal sub layer has a platinum enriched beta-(Ni,Pt)Al phase, and an alpha-NiPtAl phase, or both, and a TGO oxide layer formed by thermal growth during flash sintering.

5. The metal part according to claim 3, wherein the inner ceramic layer is chemically and thermally compatible with the sub-layer.

6. The metal part according to claim 1, wherein the physicochemical resistance property of the outer ceramic layer is at least one selected from the group consisting of sintering, corrosion, erosion and aerodynamics, wherein the property is implemented by a selection of ceramics that is at least one selected from the group consisting of thermal conductivity, porosity, hardness, and roughness that is reinforced by the flash sintering so that the outer ceramic layer has, relative to the inner ceramic layer, at least one of the properties selected from the group consisting of lower thermal expansion, greater hardness, lower thermal conductivity, higher sintering temperature, lower open porosity and less roughness.

7. The metal part according to claim 6, wherein the outer ceramic layer has lower thermal conductivity than that of the inner ceramic layer, and a natural sintering temperature, a maximum operating temperature, or both, that is substantially higher than that of the inner layer.

8. The metal part according to claim 6, wherein the thermal barrier has a composition and porosity gradient from the metal sub-layer to the outer face, and functions for anchoring to the metal sub-layer, and for protecting, the outer face, smoothing the outer face, or both.

9. The metal part according to claim 1, wherein the inner ceramic layer is selected from the group consisting of a YSZ compound of zirconia partially stabilized with yttria, a GYSZ compound of YSZ doped with gadolinium oxide, a LZ compound of lanthanum zirconate and a LZC compound of partially ceriated lanthanum zirconates.

10. The metal part according to claim 9, wherein the inner and outer ceramic layers are selected from the group consisting of xYSZ/LZ, xYSZ/LZC and xYSZ/GYSZ, wherein x is a percentage by mass of yttria greater than or equal to 7% by mass.

11. The metal part according to claim 9, wherein the LZC compounds are $LZ_yC_{(1-y)}$, wherein y=70%, y and 1-y are additional percentages of zirconium and partially ceriated zirconate cerium, and the doped YSZ compounds are tGvYSZ, wherein a percentage t by mass of gadolinium oxide is equal to 2% and a percentage v by mass of YSZ is equal to 8% by mass.

12. The metal part according to claim 10, wherein x=7% by mass.

13. The metal part according to claim 10, wherein x=8% by mass.

14. The metal part according to claim 1, wherein the porosity of the thermal barrier is between 15% and 25%.

15. The metal part according to claim 1, wherein the porosity of the outer ceramic layer is less than 15%.

16. The metal part according to claim 1, wherein the roughness of the outer ceramic layer is less than 10 micrometers.

17. A metal part made of superalloy and comprising an assembly of layers of material comprising:
   a substrate comprising a nickel-based superalloy,
   a metal sub-layer, and
   a thermal barrier, said thermal barrier comprising at least one inner ceramic layer consisting of zirconium-based refractory ceramic and at least one outer ceramic layer consisting of zirconium-based refractory ceramic having an outer face, said outer ceramic layer of zirconium-based refractory ceramic being disposed over the inner ceramic layer,
   wherein (i) the outer ceramic layer has at least one physicochemical resistance property to calcium-magnesium-aluminum-silicate oxide pollutants which is higher than that of the inner ceramic layer, (ii) the outer ceramic layer has a higher thermal resistance property than that of the inner ceramic layer, or (iii) both (i) and (ii),
   the thermal barrier being a continuous structure having a porosity gradient with porosity increasing from the outer face of the outer ceramic layer to the oxide layer formed on the metal part, and
   wherein the inner ceramic layer has a higher thermal expansion coefficient than the outer ceramic layer.

18. The metal part according to claim 17, wherein the assembly has undergone a flash sintering operation.

19. The metal part according to claim 18, wherein the metal part comprises an oxide layer formed thereon during the flash sintering operation.

* * * * *